(12) United States Patent
Monroe

(10) Patent No.: US 7,057,647 B1
(45) Date of Patent: Jun. 6, 2006

(54) DUAL-MODE CAMERA SYSTEM FOR DAY/NIGHT OR VARIABLE ZOOM OPERATION

(75) Inventor: David A. Monroe, San Antonio, TX (US)

(73) Assignee: E-Watch, Inc., San Antonio, TX (US)

( * ) Notice: Subject to any disclaimer, the term of this patent is extended or adjusted under 35 U.S.C. 154(b) by 799 days.

(21) Appl. No.: 09/593,901

(22) Filed: Jun. 14, 2000

(51) Int. Cl.
*H04N 5/225* (2006.01)
*H04N 5/238* (2006.01)

(52) U.S. Cl. .................... 348/217.1; 348/340; 348/363
(58) Field of Classification Search ............ 348/216.1, 348/217.1, 208.2, 208.6, 164, 208.1
See application file for complete search history.

(56) References Cited

U.S. PATENT DOCUMENTS

| | | | | |
|---|---|---|---|---|
| 3,691,302 A * | 9/1972 | Gaebele et al. | .......... | 348/217.1 |
| 3,891,795 A * | 6/1975 | Johnson et al. | ............. | 348/143 |
| 4,646,140 A * | 2/1987 | Bailey et al. | ............ | 348/217.1 |
| 4,851,914 A * | 7/1989 | Pfanhouser et al. | ..... | 348/217.1 |
| 5,013,142 A * | 5/1991 | Rollin et al. | ................ | 359/674 |
| 5,373,320 A * | 12/1994 | Johnson et al. | .......... | 348/217.1 |
| 5,398,055 A * | 3/1995 | Nonomura et al. | ............ | 348/61 |
| 5,852,502 A * | 12/1998 | Beckett | ....................... | 358/512 |
| 5,946,132 A * | 8/1999 | Phillips | ...................... | 359/351 |
| 5,973,315 A * | 10/1999 | Saldana et al. | ........ | 250/214 VT |
| 5,995,141 A * | 11/1999 | Hieda | ....................... | 348/208.6 |
| 6,501,503 B1* | 12/2002 | Kudo | .................... | 348/208.99 |
| 6,523,956 B1* | 2/2003 | Oshima | ...................... | 352/166 |
| 6,590,604 B1* | 7/2003 | Tucker et al. | ............ | 348/14.13 |
| 6,633,333 B1* | 10/2003 | Spencer | ...................... | 348/272 |
| 2002/0088925 A1* | 7/2002 | Nestorovic et al. | ... | 250/214 VT |

FOREIGN PATENT DOCUMENTS

WO    WO-90/05426    * 5/1990

\* cited by examiner

*Primary Examiner*—Ngoc-Yen Vu
*Assistant Examiner*—James M. Hannett
(74) *Attorney, Agent, or Firm*—Robert C. Curfiss

(57) ABSTRACT

A dual camera system uses a single lens and no moving parts in the optical path. A single lens directs a desired scene to a partially reflective beamsplitting mirror, thence to a pair of image sensors. For day/night operation, one sensor may be optimized for nighttime sensitivity, while the other is optimized for daytime operation. Alternatively, one optical path may have greater magnification, thus allowing electronic zooming with no resolution loss. The system may be enhanced with an image intensifier for nighttime operation; digital sensors for improved resolution, or orthogonal gyroscopic accelerometers for image stabilization. Additionally, the monochrome and color images may be produced simultaneously and 'fused' algorithmically, yielding an improvement in sensitivity and color resolution compared with a conventional color camera.

15 Claims, 10 Drawing Sheets

DUAL-MODE CAMERA SYSTEM FOR DAY/NIGHT OR VARIABLE ZOOM OPERATION

BACKGROUND OF THE INVENTION

1. Field of the Invention

The subject Invention is generally related to cameras and sensors and is specifically directed to a camera design that may use multiple imagers for day/night imaging, or for variable zoom. The design overcomes deficiencies of prior-art cameras wherein moving parts were required in the optical path, or wherein electronic zooming reduced image resolution. The cameras described may be either analog or digital.

2. Discussion of the Prior Art

Video cameras have become commonplace in modern life. Improvements in process technology have resulted in cameras offering high performance at steadily decreasing prices. While early cameras universally used vacuum-tube technology, modern cameras are solid-state devices using CMOS or CCD technology.

CCD and CMOS image sensors are typically organized into a planar array of photosensitive cells in orthogonal axes. When gated ON, each cell accumulates incident photons, yielding a net electrical charge in the cell. At the end of a defined exposure time, the accumulated charges are sequentially transferred from the exposed cells via switched-capacitor techniques.

Since the individual cells are merely accumulators of photons, they offer little or no inherent discrimination between various wavelengths of light. Indeed, such sensor arrays are often used for imaging using near-or-far infrared illumination. As a result of this broad-bandwidth behavior, such cameras are useful to produce monochrome video.

The overall dynamic range of such image sensors is limited. The top end of the dynamic range is limited by the cell's maximum-voltage capacity. That is, once the cell voltage has reached some specified maximum value (typically in the range of 1 to 5 volts), the cell is unable to retain any additional photon-induced charges.

The bottom end of the cell's dynamic range, which defines its sensitivity to low lighting conditions, is limited by imperfections in the array. There are two primary mechanisms. First, cell-to-cell nonuniformities exist in cell geometry, dark current, and sensitivity. These nonuniformities result in a fixed-noise pattern superimposed on images produced by the camera, even in the presence of a uniform illuminant. Second, thermal noise directly creates dynamic cell-to-cell voltage inequalities, which appear as 'snow' in rendered scenes. These two sources of noise limit the ultimate sensitivity of the system at low levels of illumination, since the effective signal-to-noise ratio decreases as illumination decreases.

A further reduction in sensitivity results if the array is configured to render color images. To render color images, the front surface of the array is overlaid with a color filter array such that adjacent cells are sensitive to different colors. A variety of such color filter schemes exist, including RGB, YCrCb, and Bayer patterns. While this enhancement does provide the array with a means to render color imagery, it reduces the overall sensitivity of the array. This reduction in optical sensitivity is due both to the non-ideal transmissivity of the filter to the desired wavelength, as well as to the elimination of energy at the remaining (non-desired) visible wavelengths.

Due to the ongoing advancement of digital techniques, a trend towards image sensors of ever-increasing resolution is evident. When the primary market for cameras was in television-related fields, there was not much demand for cameras to exceed the traditional 350 TV lines/480 scan lines common to broadcast television. Since then, a variety of video applications have emerged, driven by the emerging internet, digital still photography, and HDTV technologies. As a result, higher-resolution image sensors are in demand and are increasingly available. These higher-resolution imagers aggravate the problems of low-light sensitivity due to both their smaller cell geometries, and to the (typically) shorter exposure times they employ.

Many visual surveillance applications demand superior performance under very subdued illumination, such as night imaging with moonlight or even starlight as the ambient illuminant. While some progress has been made in improving the sensitivity of monochrome CCD imagers, such as the Watec 902H, the imagers remain insufficiently sensitive for moonlight or starlight operation. Conventional CCD or CMOS imagers are unable to produce usable video under these conditions. This problem has been remedied by the use of image intensifier technologies. These devices typically use a thin wafer of microscopically perforated opaque photoelectric material, biased by a strong electric field. Photons incident on the front of the plate produce an avalanche of photoelectrons through the microscopic pore, and energize a phosphor coating on the rear of the wafer. Currently available devices may exhibit luminous gains of perhaps 0.1 Foot-Lambert per foot-candle, which is enough to allow their use under starlight-illuminated conditions. Various commercial and military products use this technology, such as the military PVS-10 night vision scope, or the commercial OWL products produced by B.E. Meyer.

These image-intensifier devices have several operational limitations. First, the devices may be damaged if operated at 'normal' illuminations, such as daylight. Recent 'gated' and 'filmed' designs largely eliminate this problem. Also, these image-intensifier devices are not capable of rendering color scenes and are thus used in monochrome systems only.

As a result of the foregoing, separate cameras are generally required for operation under very low illuminations and for normal-to-low conditions. Prior-art systems not only use two image sensors; they use entirely separate optical paths including lenses. While this approach has utility, a significant weight and size penalty is incurred by the duplication of the lenses. This is particularly the case with night-vision cameras, which necessarily use very large lenses (160 mm and 310 mm lenses are commonplace) to increase the photon capture aperture of the system.

Another approach used in the prior art is the use of movable mirrors in the optical path. In this approach, a pair of mechanically linked mirrors is used to selectively pass the optical flux through one path, which includes an intensifier, or through a second path, which does not have in intensifier.

While this approach has merit in its elimination of a redundant lens, it is not without drawbacks. One deficiency is in the difficulty of establishing precise physical positioning of the mirrors after they have been moved. This may be a serious deficiency if the system is used as a weapon sight. Another deficiency of a moving-mirror system is the mere presence of moving parts, which inevitably reduces the ruggedness and reliability of the system.

A related problem entails the need for image stabilization within the camera. Hand-held cameras are subject to the unavoidable vibration and tremors of the human hand. This problem is exacerbated when long-range telephoto lenses are employed; the viewed image is increasingly unstable as the magnification is increased. A variety of image stabilization techniques have been applied commercially. Typically, an orthogonal pair of gyroscopic sensors are disposed parallel to the image plane. The respective acceleration outputs are twice-integrated, then are used to correct the image position. An electronic technique, used in the Hitachi VM-H81 camcorder, offsets the image sensor array scanning clocks so as to compensate for instantaneous image displacement. An electromechanical approach is used in some lens adapters, manufactured by Canon. In this technique, a planar, optically transmissive object is placed in the optical path, and is mechanically articulated to displace the optical path as necessary to maintain a constant image position in the image plane. While useful, these approaches have their disadvantages. The optical method adds attenuation to the optical path, reducing the system's signal-to-noise ratio at low illumination levels. The electronic method necessarily sacrifices a bordered area at the top and sides of the image, sufficient to cover the peak angular excursions of the image. This effectively reduces the overall resolution of the rendered image.

SUMMARY OF THE INVENTION

The subject invention is directed to a multi-imager camera, which is operable under extremes of illuminations, without the need for multiple optical paths. A single-lens system is employed, and a partially-reflective beamsplitting mirror is disposed to direct incoming images simultaneously to two or more sensors, respectively optimized for two different conditions, such as day/night operation or variable-zoom operation. This effectively overcomes the size and weight penalty incurred in a multiple-lens solution.

Beamsplitting mirrors are well-known optical devices. Such mirrors have been employed in a variety of optical systems over the years, including color cameras. Early color cameras used two beamsplitting mirrors to trisect the optical path, optical filters for the three primary colors, and three monochrome sensor tubes. Beamsplitting mirrors are also used in a variety of other optical systems, such as interferometry. As a result, such mirrors are well-known, and are commercially available in a variety of sizes and transmittance/reflectance ratios.

Since the transmittance and reflectance of such mirrors are well controlled, it is possible to optimize a single-lens, dual-path system for dynamic range. For example, the daylight/color camera is used when illuminant levels are high. It is thus possible to select a mirror that diverts a small percentage of the incident light towards the daylight color camera, while diverting a large percentage of the incident light towards the low-light monochrome camera and/or intensifier.

The addition of an image intensifier enhances the sensitivity of the device under conditions of low illumination. The intensifier is placed in the optical path at a point beyond the beamsplitting mirror, and in whichever path the mirror 'favors'. For example, if the selected mirror is 90% transmissive and 10% reflective, then the intensifier is located behind the mirror where it can receive the preponderance of the incident optical energy. Conversely, if the mirror is 90% reflective and 10% transmissive, then the image intensifier is positioned to capture the reflected light from the mirror. In either case, the front surface of the intensifier must necessarily be located in the image plane of the lens, as extended or displaced by the beamsplitting mirror.

Image sensors and image intensifiers tend to have somewhat limited dynamic ranges. At high light levels, the devices may saturate or suffer physical damage. At very low light levels, the image produced by the device may become noisy, as previously discussed. This difficulty may be largely overcome through the use of an iris mechanism, which acts to limit the amount of optical energy reaching the intensifier under high illumination.

In an alternative embodiment, digital image sensors are advantageously employed to increase the overall system resolution. Moreover, multiple digital sensors may share a common address and/or data bus, and may be selectively enabled. The selection may be automatic based on scene illumination, or may be manual.

In another enhancement, stabilization of the image produced by a digital sensor is effectuated by measuring and twice integrating the angular acceleration in two orthogonal axes parallel to the sensor's axes. Such instantaneous position information is then used to temporally offset the camera's scan timing signals, thus yielding a stable image. Alternatively, the instantaneous position information may generate an address offset in the read addresses used to access the imager array or its buffer, also yielding a stable image.

In yet another enhancement, the individual optical paths may use relay lenses of different magnifications. It is thus possible to selectively 'zoom' a desired scene by selecting one imager or the other. This allows zooming without moving parts in the optical path. It also allows the scene to be zoomed without loss of image resolution, as is the case in prior-art systems which zoomed by scanning a subset of a scanned image.

It is, therefore, an object and feature of the present invention to provide a dual day/night camera without the use of dual lenses.

It is an additional object and feature of the subject invention to provide such day/night operation through the use of a partially-reflective beamsplitting mirror.

It is another object and feature of the present invention to enhance the low-light performance of the day/night camera through the use of an image intensifier device.

It is another object and feature of the subject invention to employ digital image sensors, with the aim of providing enhanced image resolution.

It is another object and feature of the subject invention to effect digital imager selection by enabling or disabling one or more digital image sensors that share a common bus.

It is another object and feature of the subject invention to provide a means for selectively magnifying an image, without moving optical parts and without sacrifice of image resolution.

It is yet another object and feature of the subject invention to stabilize the captured images by sensing angular movements of the sensor and adjusting the scan timing or read addresses thereof.

Other objects and features will be readily apparent from the accompanying drawings and detailed description of the preferred embodiment.

DETAILED DESCRIPTION OF THE PREFERRED EMBODIMENTS

Figure 1:
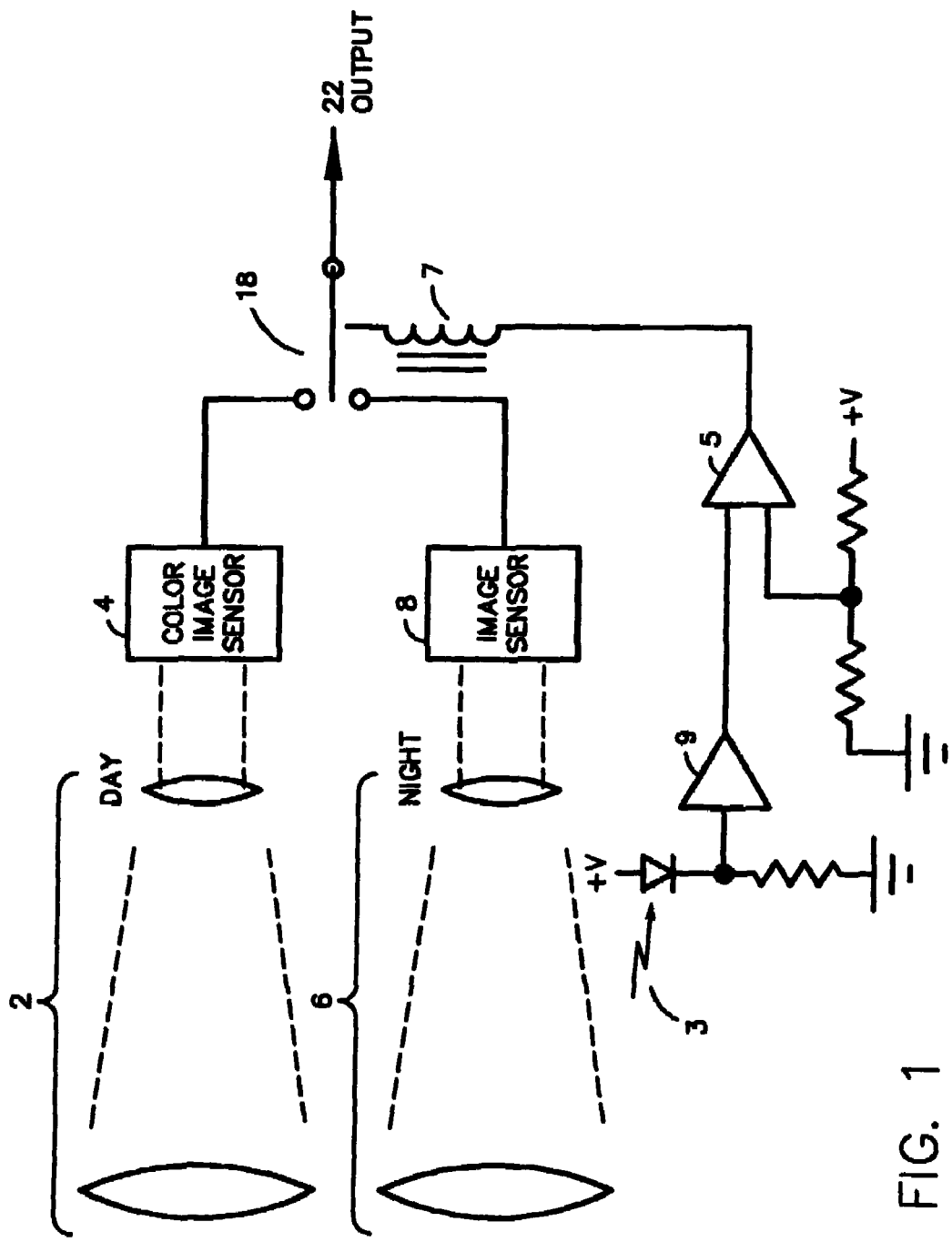
FIG. 1 depicts prior-art day/night cameras, which use dual optical paths and sensors.

Referring now to FIG. 1, a prior-art system is depicted, which uses two lenses and sensors to span the desired range of ambient illumination. Daylight operation is accomplished using daylight lens 2 and color image sensor 4. Nighttime scenes are captured by lens 6 and image sensor 8, which is a monochrome area sensor optimized for high sensitivity. Typically, the overall ambient illumination is detected by, as an example, a photodiode 3. The resulting signal is buffered by buffer 9, compared with a reference value by comparator 5, and used to drive a video source selection relay 7.

The disadvantages of such a typical system are readily apparent. The overall size, weight and cost are dramatically increased by the inclusion of the additional lens.

Figure 2:
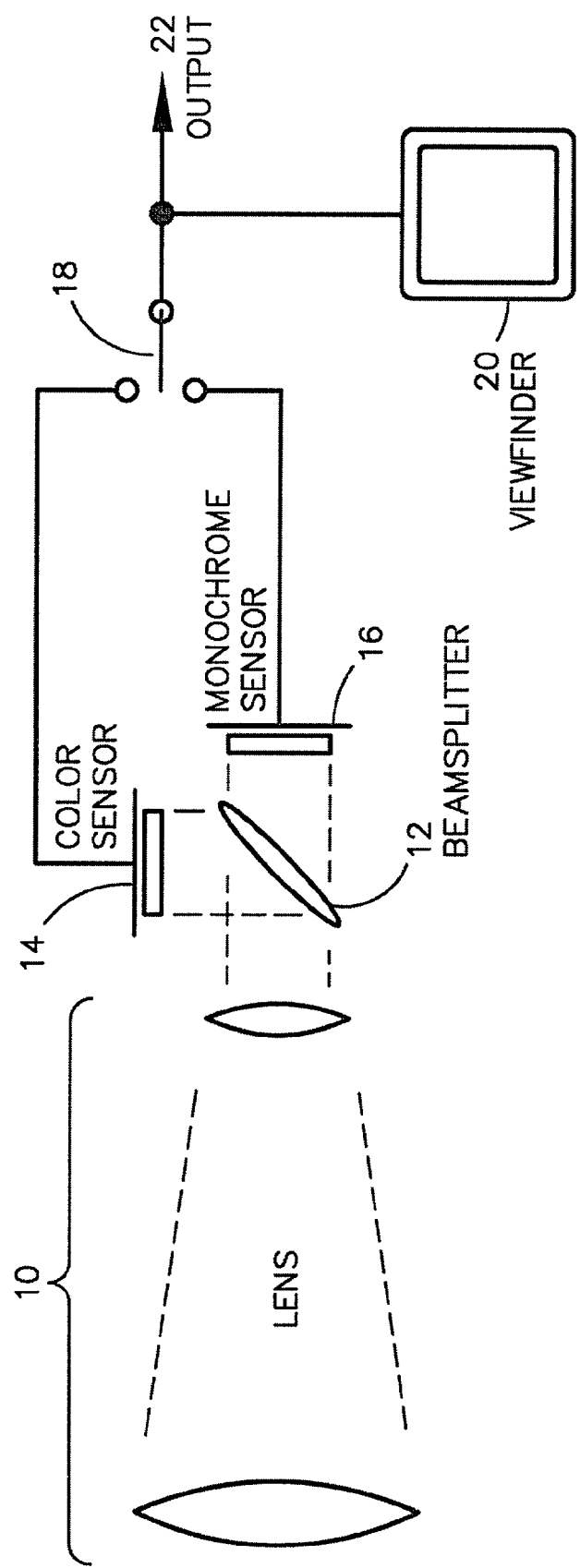
FIG. 2 is a day/night camera using one optical path, two sensors, a beam-splitting mirror, and an electrical switch to select the desired camera output.

An enhanced system, subject of the present invention, is depicted in FIG. 2. A single lens 10 is used to direct a desired scene onto the sensor optics, consisting of beamsplitting mirror 12, sensitive monochrome sensor 16 and color sensor 14. The relative positions of the respective sensors 14 and 16 may be exchanged, if necessary, without departing from the spirit and scope of the invention. The beamsplitting mirror 12 is partially reflective, in some proportion designed to optimize the desired optical behavior. For example, if absolute nighttime sensitivity is the highest goal of the design, then the beamsplitter may be 5 percent reflective and 95 percent transmissive, so as to maximize the amount of optical flux that reaches the nighttime sensor. The appropriate sensor output is selected by switch 18. Note that switch 18 could be automated as depicted in FIG. 1, through the use of an ambient light level sensor and relay. The selected sensor output signal 22 is optionally displayed on viewfinder 20.

Figure 3:
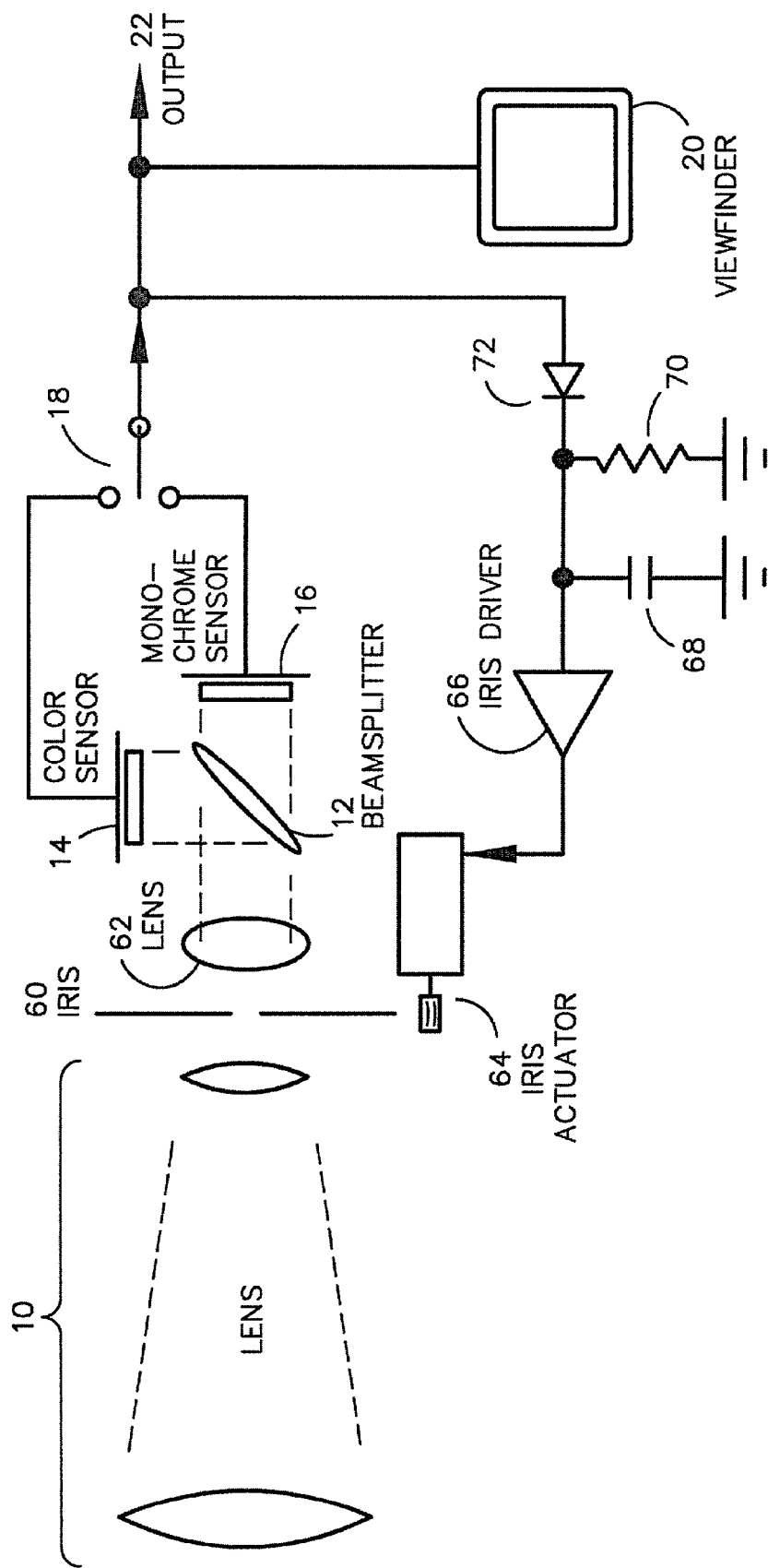
FIG. 3 depicts the day/night camera of FIG. 2, with an additional controlled-iris mechanism to provide increased dynamic range.

In FIG. 3, the basic system of FIG. 2 is enhanced with a driven iris, which serves to limit the amount of incident light that arrives at the monochrome sensor 16 or, indeed, at the color sensor 14. The overall output video signal 22 is sampled by diode 72, filtered by capacitor 68, given a time constant via resistor 70, and applied to iris driver 66. The iris driver, in turn, drives the iris actuator 64 and the iris 60, so as to limit the output signal 22 if it increases to some predetermined level. This serves to limit and stabilize the amount of light incident on the sensors 14 and 16.

Figure 4:
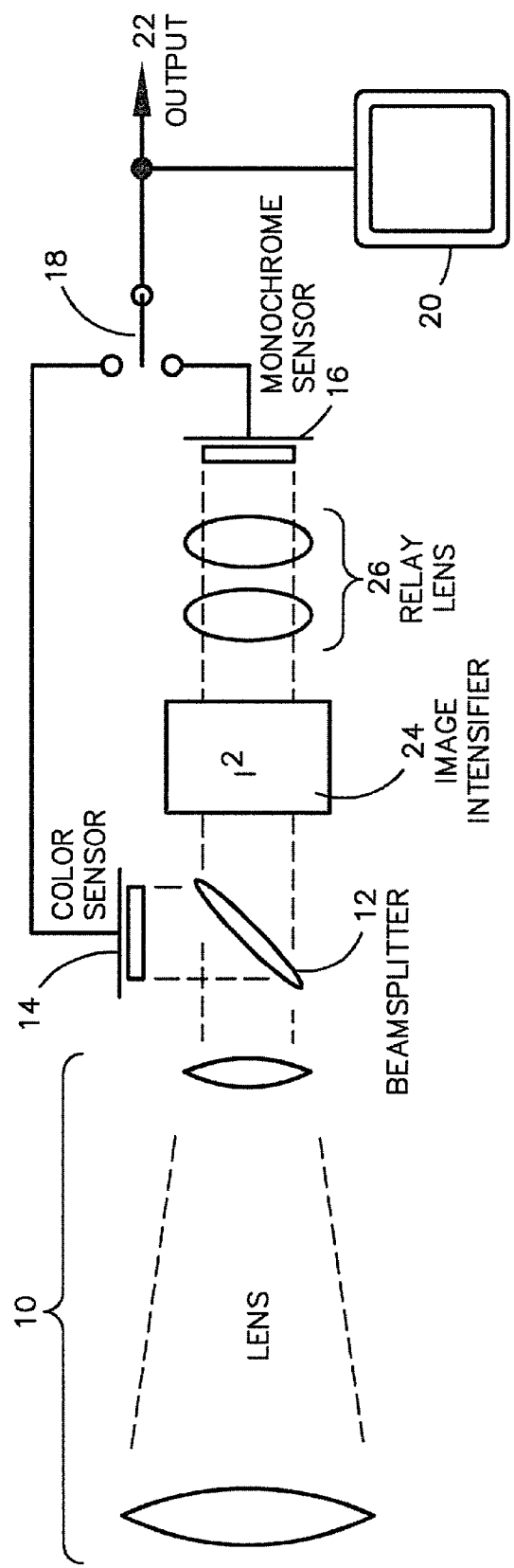
FIG. 4 depicts the day/night camera of FIG. 2, with the addition of an image-intensifier device to extend the low-light sensitivity of the system.

FIG. 4 depicts the basic system of FIG. 2, as supplemented by the inclusion of an image intensifier 24. Since the image on the rear surface of the image intensifier is a simple planar image, a relay lens system 26 may be necessary to transfer the image from the rear surface of the intensifier 24 to the monochrome sensor 16. Other techniques may also be employed to transfer the image, such as the fusion of fiber optic bundles between the intensifier and imager, or direct bonding of the intensifier to the imager.

Figure 5:
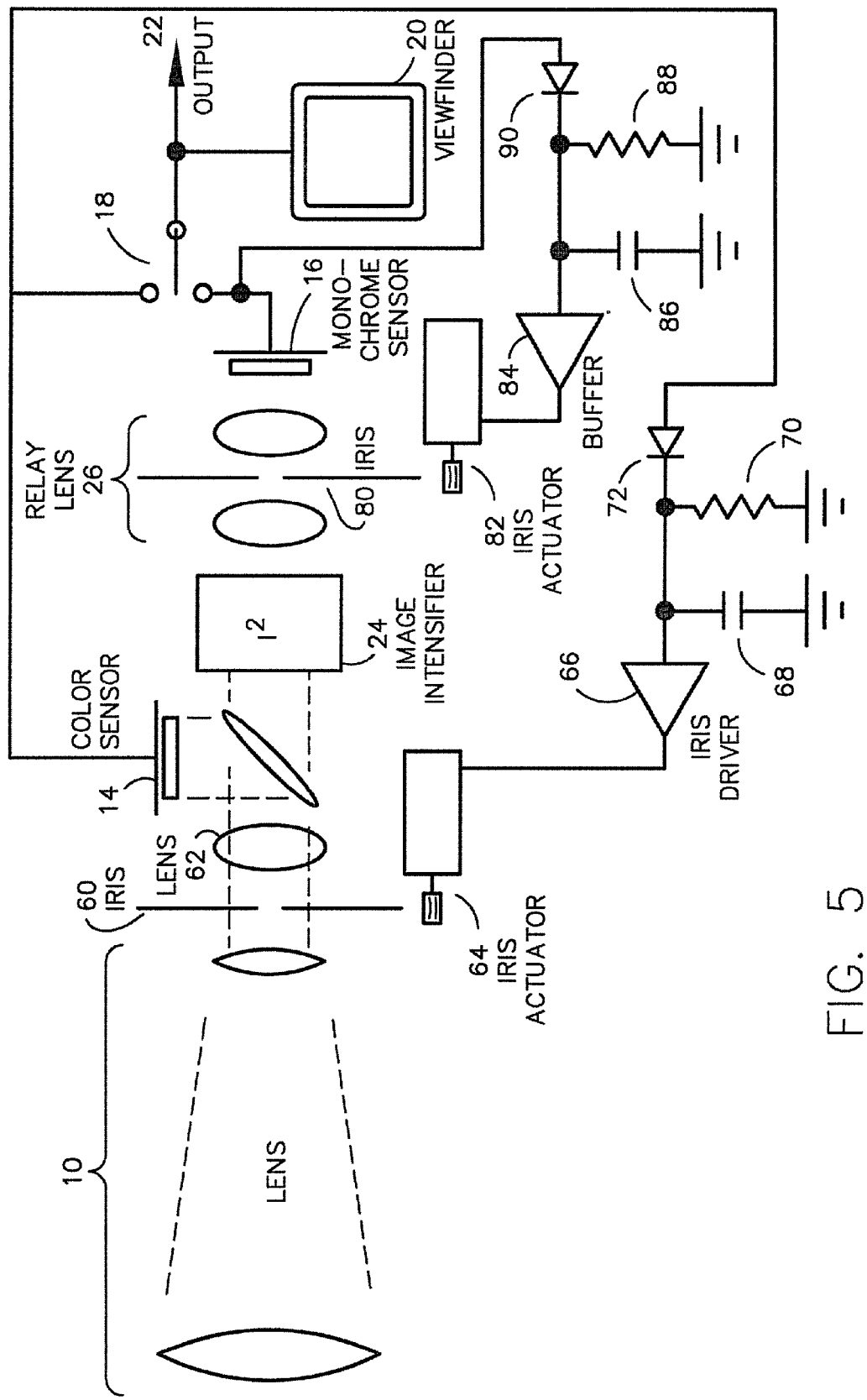
FIG. 5 depicts the day/night system of FIG. 4, with the addition of controlled irises to extend the dynamic range of the system, and to protect the image intensifier mechanism.

FIG. 5 depicts an enhancement to the system of FIG. 4. In FIG. 5, a second iris 80 is added, immediately in front of the monochrome sensor 16. This second iris is used to limit the amount of illumination reaching the sensitive monochrome sensor 16, preventing it from suffering from saturation when the intensifier output image is bright. The output signal from the monochrome sensor 16 is sampled by diode 90, filtered by capacitor 86, given a time constant by resistor 88, buffered by buffer 84, and drives the iris 80 via actuator 82. This effectively stabilizes and limits the output signal from the monochrome sensor 16. This approach frees the first iris 60 to control the overall output from the system, as depicted earlier in FIG. 3.

Figure 6:
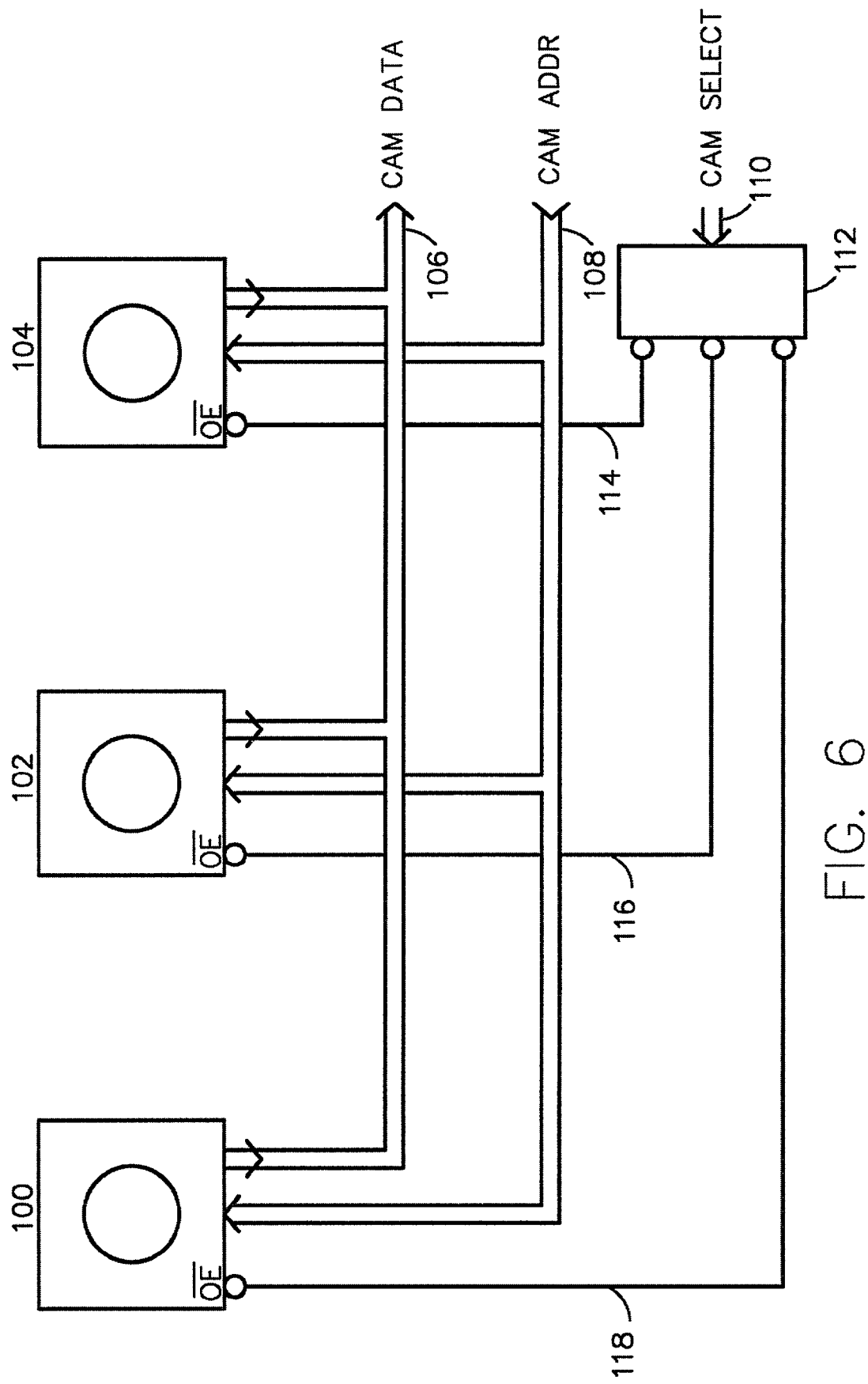
FIG. 6 depicts a multi-imager camera using digital imagers.

FIG. 6 depicts a multiple-imager version of the system. Multiple digital imagers 100, 102, and 104, share a common address bus 108 and data bus 106. A camera selection signal 110 is applied to multiplexer 112, which thereupon selects one of the sensors via enable lines 114, 116, and 118. This method allows the selection of a desired camera. The individual cameras 100, 102, and 104 may share a common optical path, as in previous examples which use a two-way beamsplitting mirror. The individual cameras 100, 102, and 104 may be separately optimized for different purposes, such as day vs. night, 1× zoom vs. 2× zoom, etc.

Figure 7:
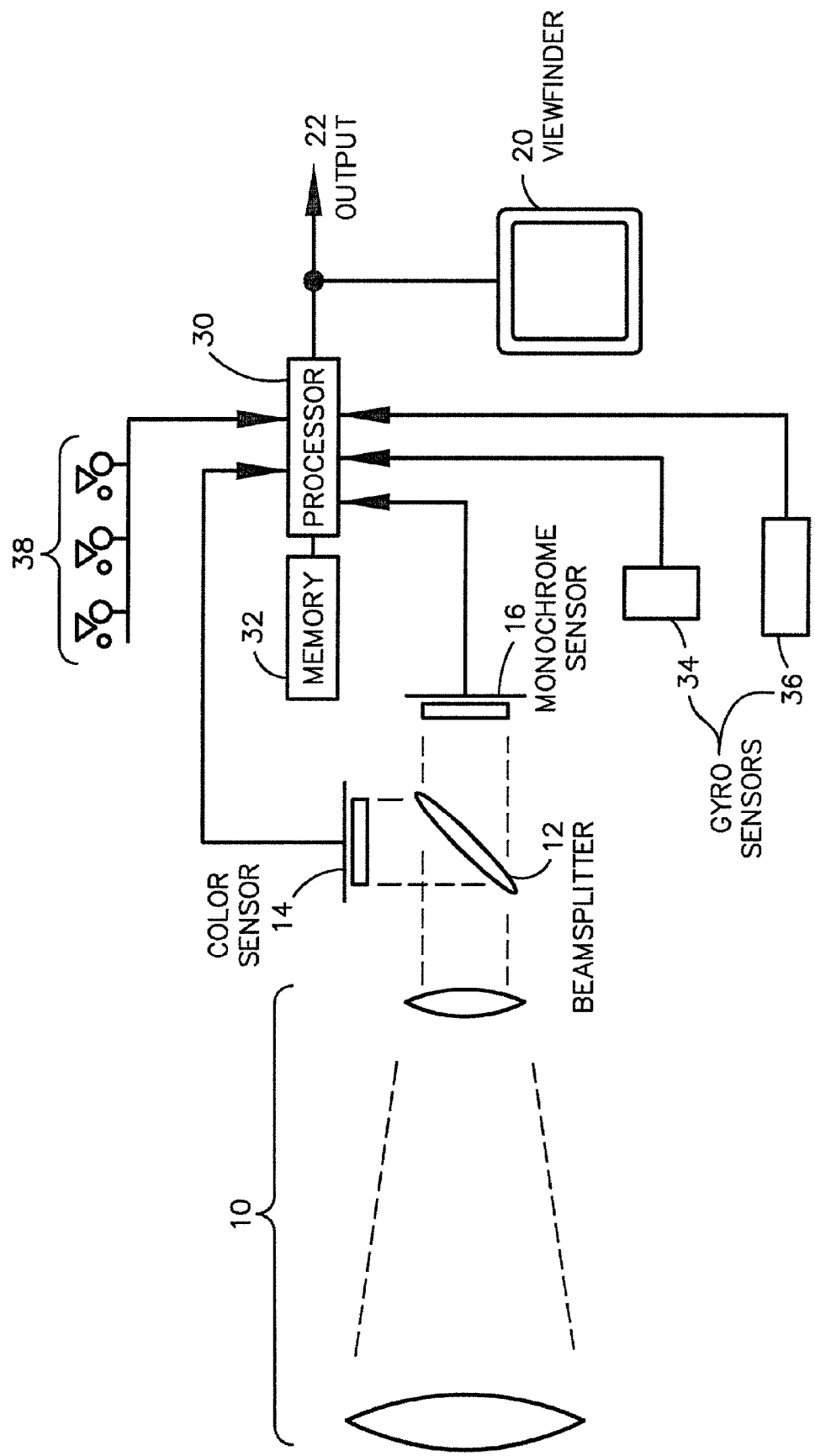
FIG. 7 depicts the day/night camera of FIG. 2, using digital image sensors.

FIG. 7 depicts an enhancement to the basic system of FIG. 2, wherein the analog sensors are replaced with high-resolution digital sensors 14 (color) and 16 (monochrome).

As before, a lens system 10 directs a desired scene towards the beamsplitter 12, thence towards the dual image sensors 14 and 16. Images captured by these digital sensors are transferred to a suitable signal processor 30 with associated program/data memory 32. The processor 30, among other tasks, controls the scanning of the selected image sensor 14 or 16, and produces a corresponding output signal 22 in a desired signal format, such as NTSC, PAL, or a digital format such as D-1. A pair of orthogonal gyroscopic accelerometers 34 and 36 are disposed in a plane parallel to the image plane of the monochrome sensor 16. Angular accelerations detected by sensors 34 and 36 are twice-integrated by processor 30, to derive a knowledge of the instantaneous angular position of the device. This information is then used to temporally offset the image sensor scanning signals produced by the processor 30, effectively stabilizing the image position. Alternatively, the instantaneous position information previously described may be used to variably offset the read addresses driven to the imager or its buffer, again effectively stabilizing the image. A variety of user input pushbuttons 38 are provided to allow user control of various camera parameters, for instance brightness, stabilization on/off, day/night mode, power on/off, etc.

An additional benefit of the dual-digital-sensor system of FIG. 7 is the ability to scan the imager in reverse-pixel or reverse-line order. This ability overcomes the optical problem imposed by the inclusion of the mirror; images that have been reversed vertically or horizontally by the mirror may be "re-reversed" electronically.

An additional benefit of the dual-digital-sensor system of FIG. 7 is the ability to 'fuse' the two images. The monochrome sensor 16 is used to provide scene luminance information, while the color sensor 14 is used to provide chrominance information. Note that, since luminance information is provided by sensor 16, it is possible to use non-traditional color filters on color sensor 14 to increase its resolution and sensitivity. For example, a simple CrCb filter could be used on color sensor 14, with no pixels wasted for detecting luminance. The processor 30 may be used to scale and merge the two information streams into one signal. This method is not possible in prior-art systems, which used movable mirrors.

Figure 8:
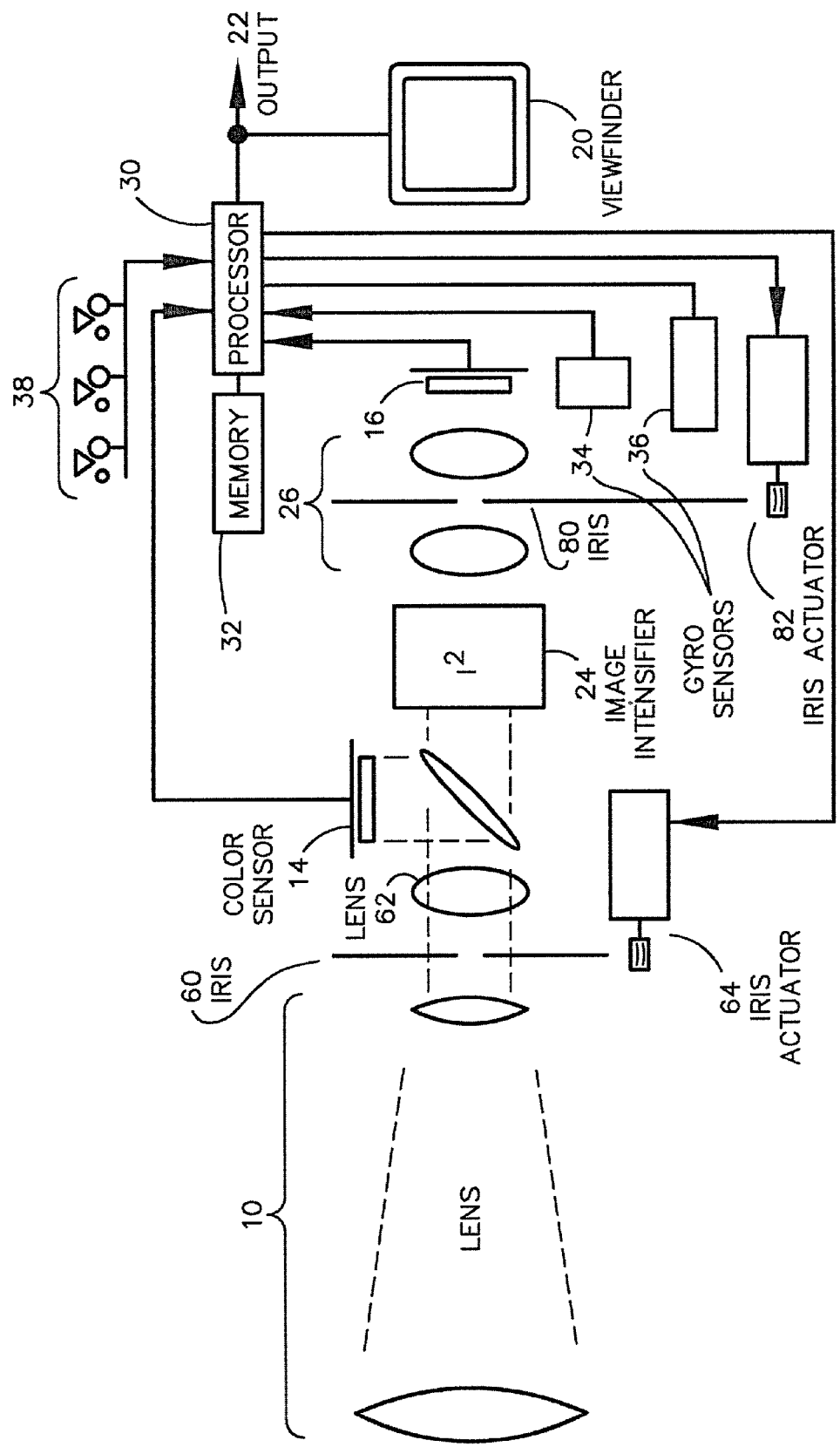
FIG. 8 depicts the digital day/night camera of FIG. 6, with the addition of an image-intensifier device and dual irises.

FIG. 8 depicts an enhancement to the digital system of FIG. 7, wherein the dual-iris arrangement of FIG. 5 is used to optimize the dynamic range of the system. As before, incident light reaching monochrome sensor 16 is controlled by iris 80, as driven by actuator 82 under processor control. This effectively prevents the sensitive monochrome imager from suffering saturation or overload. The intensifier 24 is protected by iris 60, driven by actuator 64, also under processor control. This iris serves to protect the intensifier device from excessive illumination. The dynamic range of both imagers may also be improved by the inclusion of automatic gain control, used in conjunction with the irises.

Figure 9:
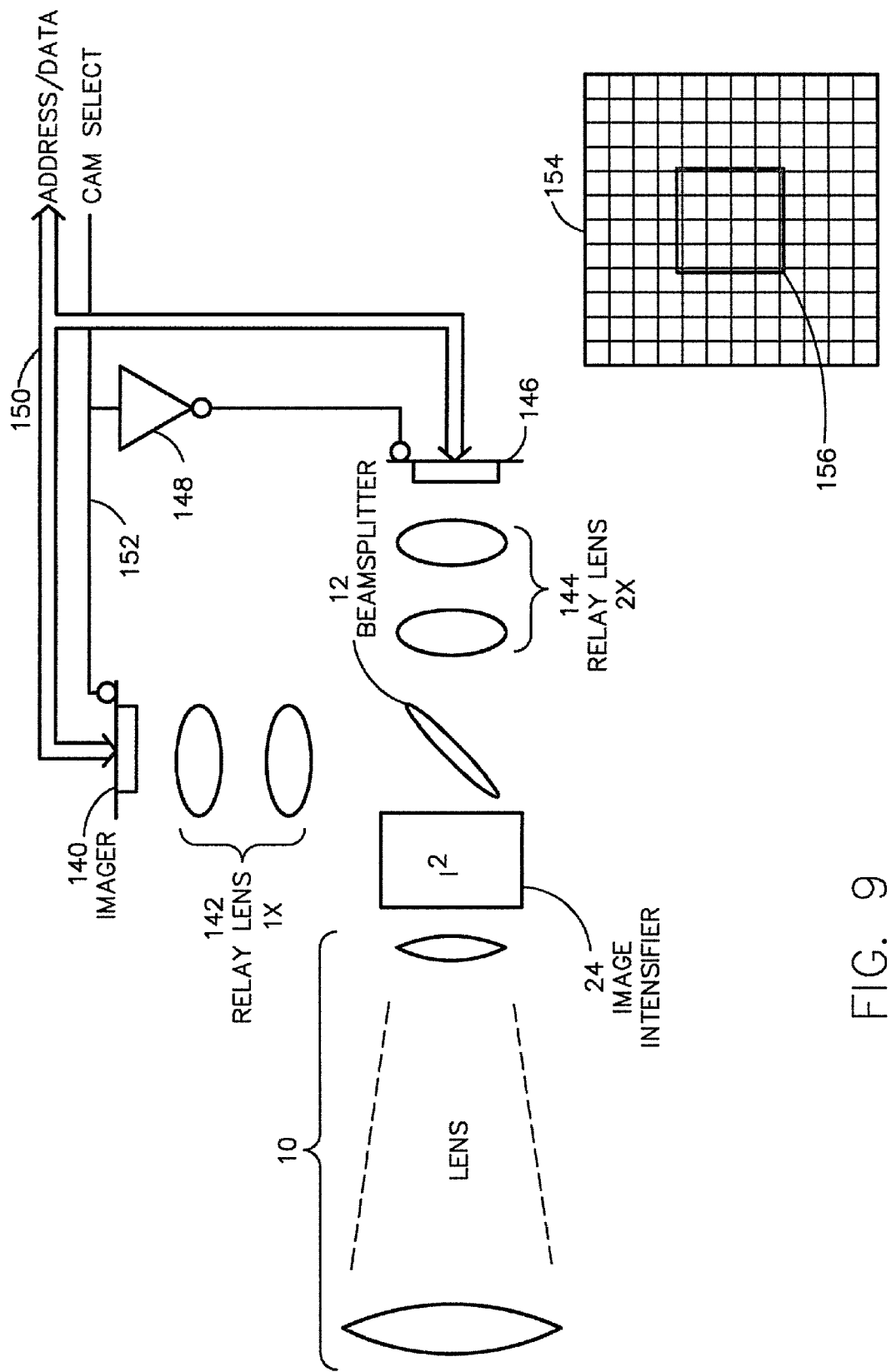
FIG. 9 depicts the use of the invention to selectively zoom an image

FIG. 9 depicts the use of the invention to achieve selectable 'zoom' ratios, or magnifications, without moving optical parts and without reduction of image resolution. While the example in FIG. 9 depicts a pair of digital imagers, analog imagers could be used to the same effect. A lens 10 captures a desired scene and passes it to an optional image intensifier 24. The image thereupon passes to a beamsplitting mirror 12, thence to a pair of imagers 140 and 146 via relay lenses 142 and 144 respectively. The relay lenses are selected to have differing magnification ratios. In the example shown, relay lens 142 exhibits a magnification of 1:1, while relay lens 144 exhibits a magnification of 2:1. Imager 140 or imager 146 may be selected via CAM SELECT signal 152 and inverter 148. This effectively allows selection of a desired image, or selection of the same image with different magnification. As an example, lens 140 and imager 142 may render a scene 154, of some given angular field of view. When lens 144 and imager 146 are selected, a smaller field of view 156 is rendered, but at the same resolution as the previous, larger image.

Figure 10:
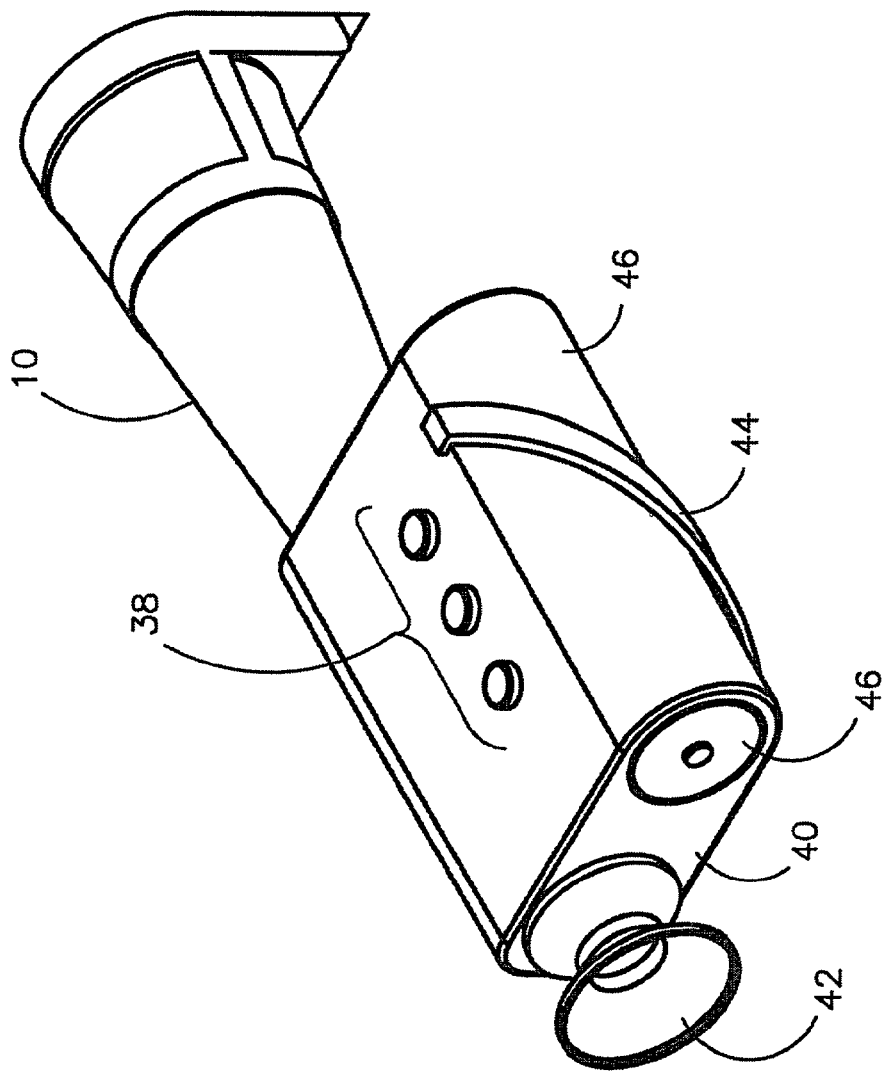
FIG. 10 is an example of a handheld embodiment of the system.

FIG. 10 depicts a preferred embodiment a handheld version of the device. A housing 46 contains a lens 10, user controls 38, eyepiece 42, battery compartment access panel 46, and carrying strap 44.

While certain features and embodiments of the invention have been described in detail herein it should be understood that the invention includes all improvements, modifications and enhancements within the scope and spirit of the following claims.

What is claimed is:

1. A multi-imager camera operable under extremes of illuminations from high ambient lighting conditions to low ambient lighting conditions without the need for multiple optical paths, comprising:
   a. a single primary lens system for directing a beam;
   b. a beam-splitting mirror adapted for receiving and distributing the beam directed by the single lens;
   c. the beam-splitting mirror including a surface for dual-path diverting capability, wherein a first portion of the directed beam is diverted in one direction and a second portion of the directed beam is diverted in a second direction;
   d. the surface of the beam-splitting mirror is entirely partially-reflective and entirely partially-transmissive for creating different intensities of the beam;
   e. a first image sensor for receiving the first portion of the directed beam;
   f. a second image sensor for receiving the second portion of the directed beam;
   g. wherein each image sensor includes an iris and an iris controller for selectively activating and deactivating each iris; and
   h. wherein the iris controller comprises an iris driver and an iris actuator.

2. The camera of claim 1, further comprising an image intensifier associated with one of the sensors for intensifying the image under low ambient lighting conditions.

3. The camera of claim 1, wherein the first diverted beam is a high ambient lighting beam and the second diverted beam is a low ambient lighting beam.

4. The camera of claim 1, wherein each image sensor is a digital image device.

5. The camera of claim 1, wherein at least one image sensor is a digital image device.

6. The camera of claim 1, further including a singled data bus for transmitting the data collected and processed by the image sensors and further including selection means for enabling and disabling alternative of the sensors in order to assure only one image sensor is transmitting data on the bus at any time.

7. The camera of claim 6, wherein the iris controllers are used for increasing the dynamic range of each sensor through selective iris control.

8. The camera of claim 1, wherein the first sensor is a color sensor and wherein the second sensor is a monochrome sensor.

9. The camera of claim 8, further including an image intensifier positioned between the mirror and the monochrome sensor.

10. The camera of claim 9, further including a relay lens positioned between the image intensifier and the monochrome sensor.

11. The camera of claim 1, further including a display device associated with the image sensors for displaying the output therefrom.

12. The camera of claim 11, wherein the display device is a viewfinder.

13. The camera of claim 12, wherein the camera is housed in a single, handheld, portable unit.

14. A camera, comprising:
 a single lens system adapted to direct a beam;
 a beam-splitting mirror adapted to receive and distribute the directed beam;
 the beam-splitting mirror including a surface for dual-path diverting capability, wherein a first portion of the directed beam is diverted in one direction and a second portion of the directed beam is diverted in a second direction;
 the surface of the beam-splitting mirror is entirely partially-reflective and entirely partially-transmissive for creating different intensities of the beam;
 a first image sensor adapted to receive the first portion of the distributed beam;
 a second image sensor adapted to receive the second portion of the distributed beam;
 wherein each image sensor includes an iris and an iris controller for selectively activating and deactivating each iris; and
 a switch adapted to select an output from at least one of the image sensors.

15. A module, comprising:
 a single lens system adapted to direct a beam;
 a beam-splitting mirror adapted to receive and distribute the directed beam;
 a first image sensor adapted to receive a first portion of the distributed beam, whereby the first portion of the distributed beam is a high ambient lighting beam;
 a second image sensor adapted to receive a second portion of the distributed beam, whereby the second portion of the distributed beam is a low ambient lighting beam; and
 wherein each image sensor includes an iris and an iris controller for selectively activating and deactivating each iris.

* * * * *